(12) United States Patent
Lin

(10) Patent No.: US 8,065,777 B2
(45) Date of Patent: Nov. 29, 2011

(54) CENTRIFUGAL WATER SEPARATOR FOR MOP

(76) Inventor: Yen-Tang Lin, Taichung County (TW)

(*) Notice: Subject to any disclaimer, the term of this patent is extended or adjusted under 35 U.S.C. 154(b) by 214 days.

(21) Appl. No.: 12/455,498

(22) Filed: Jun. 2, 2009

(65) Prior Publication Data

US 2010/0218335 A1  Sep. 2, 2010

(30) Foreign Application Priority Data

Feb. 27, 2009 (TW) ............... 98203020 U
Mar. 26, 2009 (TW) ............... 98204791 U

(51) Int. Cl.
*A47L 13/58* (2006.01)

(52) U.S. Cl. ............ 15/260; 34/58; 68/23.3; 210/360.1; 210/380.1

(58) Field of Classification Search ........... 15/260, 15/263; 34/58; 68/23 R, 23.3, 241; 210/360.1, 210/280.1, 280.2, 403, 380.1, 380.2
See application file for complete search history.

(56) References Cited

U.S. PATENT DOCUMENTS

| | | | | |
|---|---|---|---|---|
| 1,665,065 A | * | 4/1928 | Malloy | 68/23 R |
| 4,209,916 A | * | 7/1980 | Doyel | 34/58 |
| 2009/0151399 A1 | * | 6/2009 | Lin | 68/23 R |
| 2010/0287724 A1 | * | 11/2010 | Hsu | 15/260 |

* cited by examiner

*Primary Examiner* — Mark Spisich
(74) *Attorney, Agent, or Firm* — Charles E. Baxley

(57) ABSTRACT

A centrifugal water separator for mop includes a bucket, a separating device and a drive device respectively mounted in the bucket. A first room, a second room and a third room respectively defined in the bucket, wherein an L-shaped partition is formed in the bucket to separate the third room from the first room and the second room, and the first room laterally communicates with the second room. The separating device includes an axle perpendicularly extending through the partition and a separating trough securely mounted to an upper end of the axle. The drive device includes a pedal mounted thereon for driving the axle with the separating trough when being stepped. The drive device includes a planet gear set sleeved on the axle and connected to the pedal for effectively drive the axle and used as a speed increaser.

8 Claims, 19 Drawing Sheets

CENTRIFUGAL WATER SEPARATOR FOR MOP

BACKGROUND OF THE INVENTION

1. Field of the Invention

The present invention relates to a water separator, and more particularly to a centrifugal water separator for mop.

2. Description of Related Art

A conventional centrifugal water separator for mop in accordance with the prior art comprises separating trough mounted in a bucket for receiving a head of the mop during separating water. A driving device is mounted in the bucket for driving the separating trough in a high speed for providing centrifugal force to the head of the mop.

However, the conventional centrifugal water separator uses a warm gear to directly and laterally drive an axle that is longitudinally connected to the separating trough such that the axle needs to load a side stress. Consequently, the separating trough is unstable during being operated such that the use life of the conventional centrifugal water separator is shortened.

In addition, the stagnant water may splash out of the bucket to wet the user's pants pollute the floor during separating. It is an inconvenient design and needs to be advantageously altered.

The present invention has arisen to mitigate and/or obviate the disadvantages of the conventional centrifugal water separator for mop.

SUMMARY OF THE INVENTION

The main objective of the present invention is to provide an improved centrifugal water separator for mop, which is easily operated.

To achieve the objective, the centrifugal water separator comprises a bucket, a separating device and a drive device respectively mounted in the bucket. A first room, a second room and a third room respectively defined in the bucket, wherein an L-shaped partition is formed in the bucket to separate the third room from the first room and the second room, and the first room laterally communicates with the second room. The separating device includes an axle perpendicularly extending through the partition and a separating trough securely mounted to an upper end of the axle. The drive device includes a pedal mounted thereon for driving the axle with the separating trough when being stepped. The drive device includes a planet gear set sleeved on the axle and connected to the pedal for effectively drive the axle and used as a speed increaser.

Further benefits and advantages of the present invention will become apparent after a careful reading of the detailed description with appropriate reference to the accompanying drawings.

DETAILED DESCRIPTION OF THE INVENTION

Figure 1:
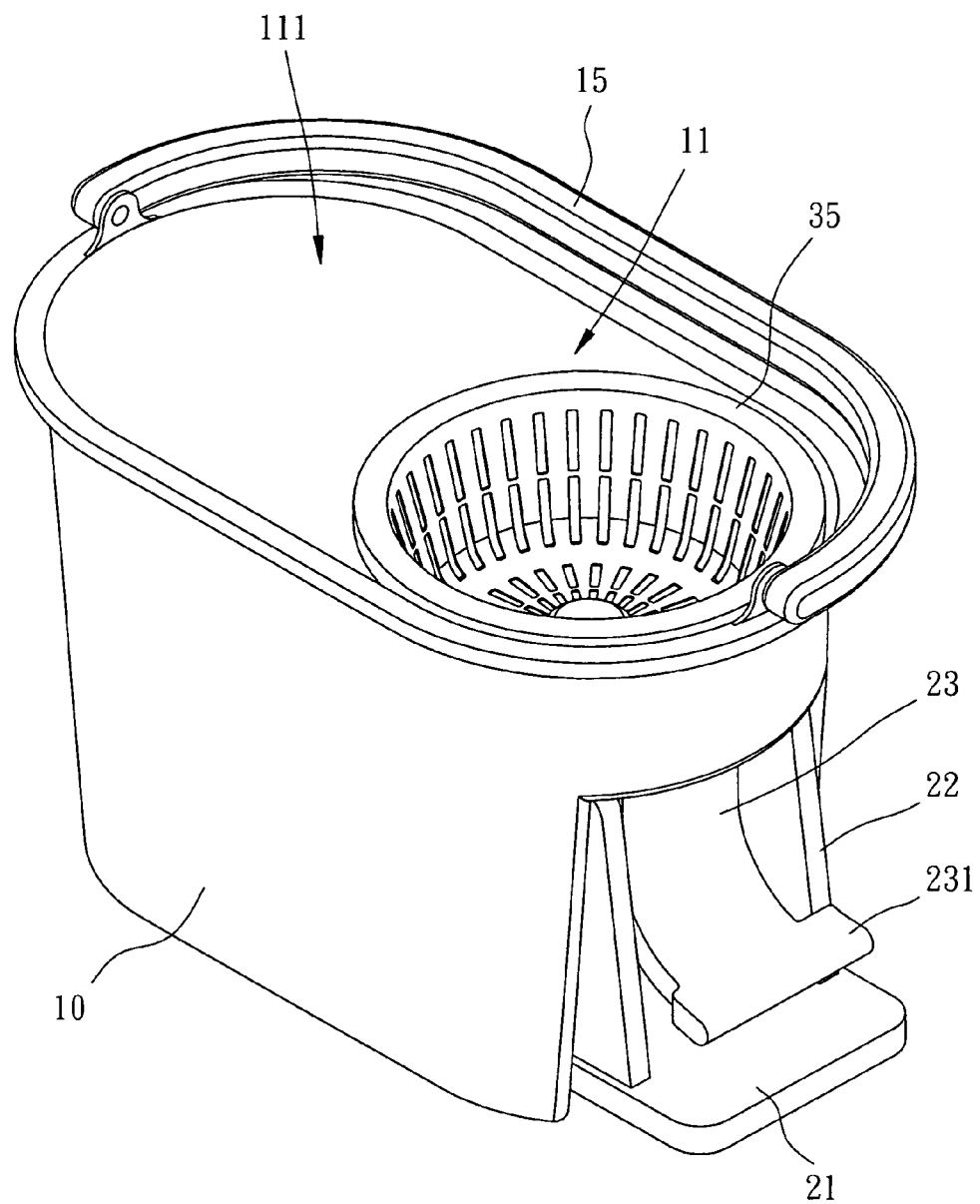
FIG. 1 is a perspective view of a centrifugal water separator for mop in accordance with the present invention.
Figure 2:
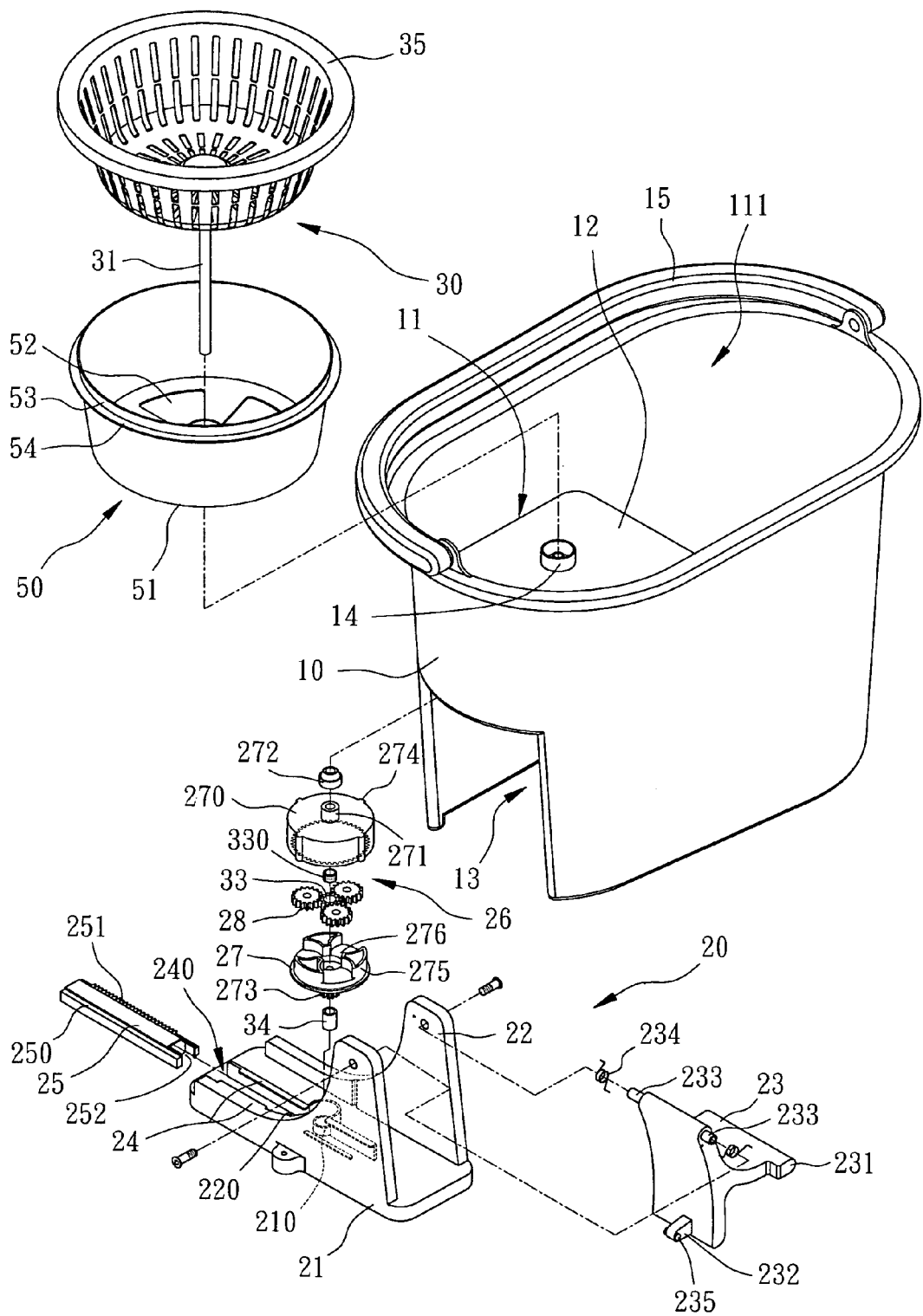
FIG. 2 is an exploded perspective view of the centrifugal water separator in FIG. 1.
Figure 3:
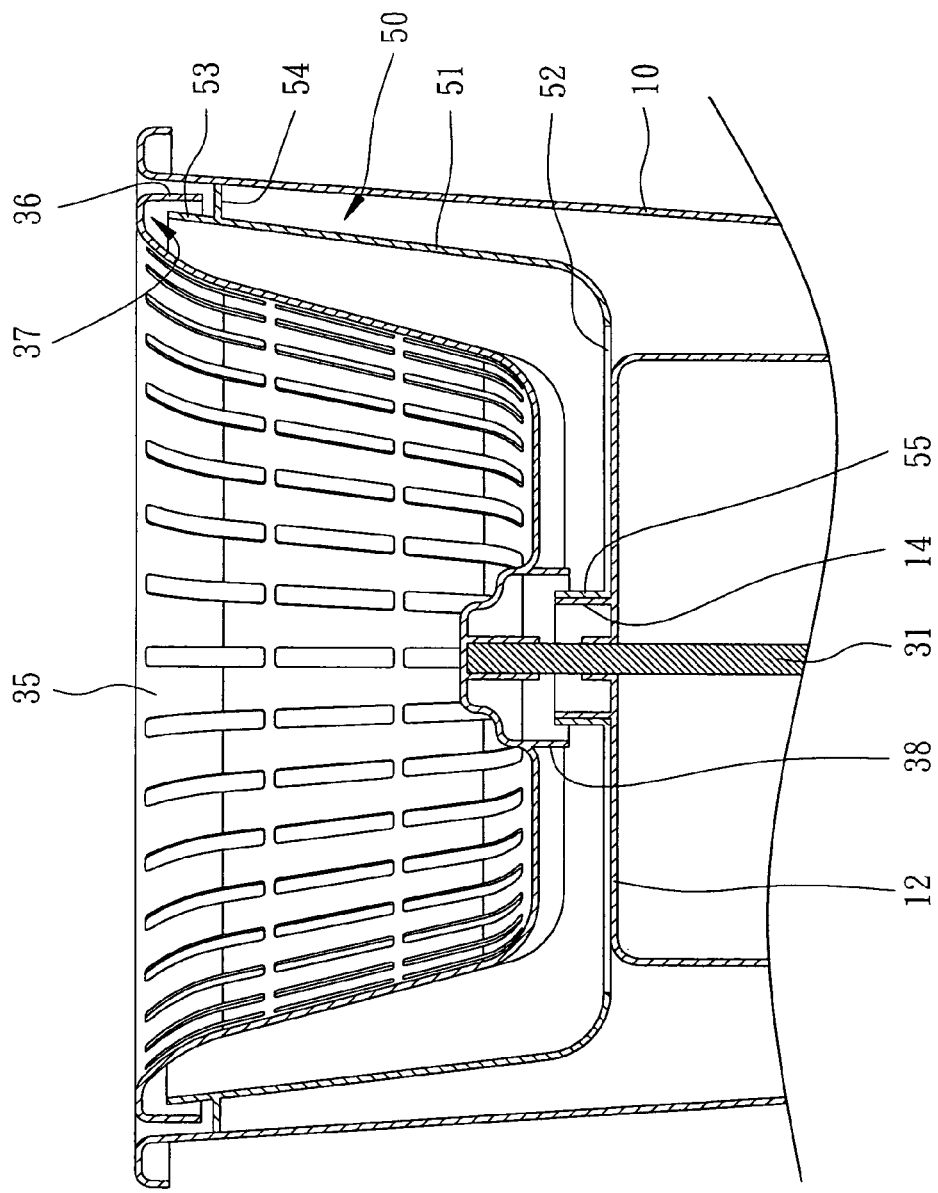
FIG. 3 is a partially cross-sectional of the centrifugal water separator in FIG. 1.

Referring to the drawings and initially to FIGS. 1 and 2, a centrifugal water separator for mop in accordance with the present invention comprises a bucket (10), drive device (20) mounted in the bucket (10), a separating device (30) mounted in the bucket (10) and a fender (50) mounted in the bucket (10) and surrounding the separating device (30).

With reference to FIGS. 2-5, a first room (11) is defined in the bucket (10) for receiving the separating device (30). A second room (111) is defined in the bucket (10) for user to clean the mop and laterally communicates with the first room (11). A partition (12) is located in the bucket (10) to define a third room (13) for receiving the drive device (20). The partition (12) has a horizontal portion (not numbered) having a skirt (14) perpendicularly and upwardly extending from the horizontal portion of the partition (12), wherein the fender (50) is mounted to the skirt (14). A handle (15) is pivotally mounted to a top portion of the bucket (10) for user to easily carry the bucket (10).

The separating device (30) includes an axle (31) centrally and longitudinally extending through the skirt (14) and a separating bowl (35) longitudinally to an upper end of the axle (31).

Figure 4:
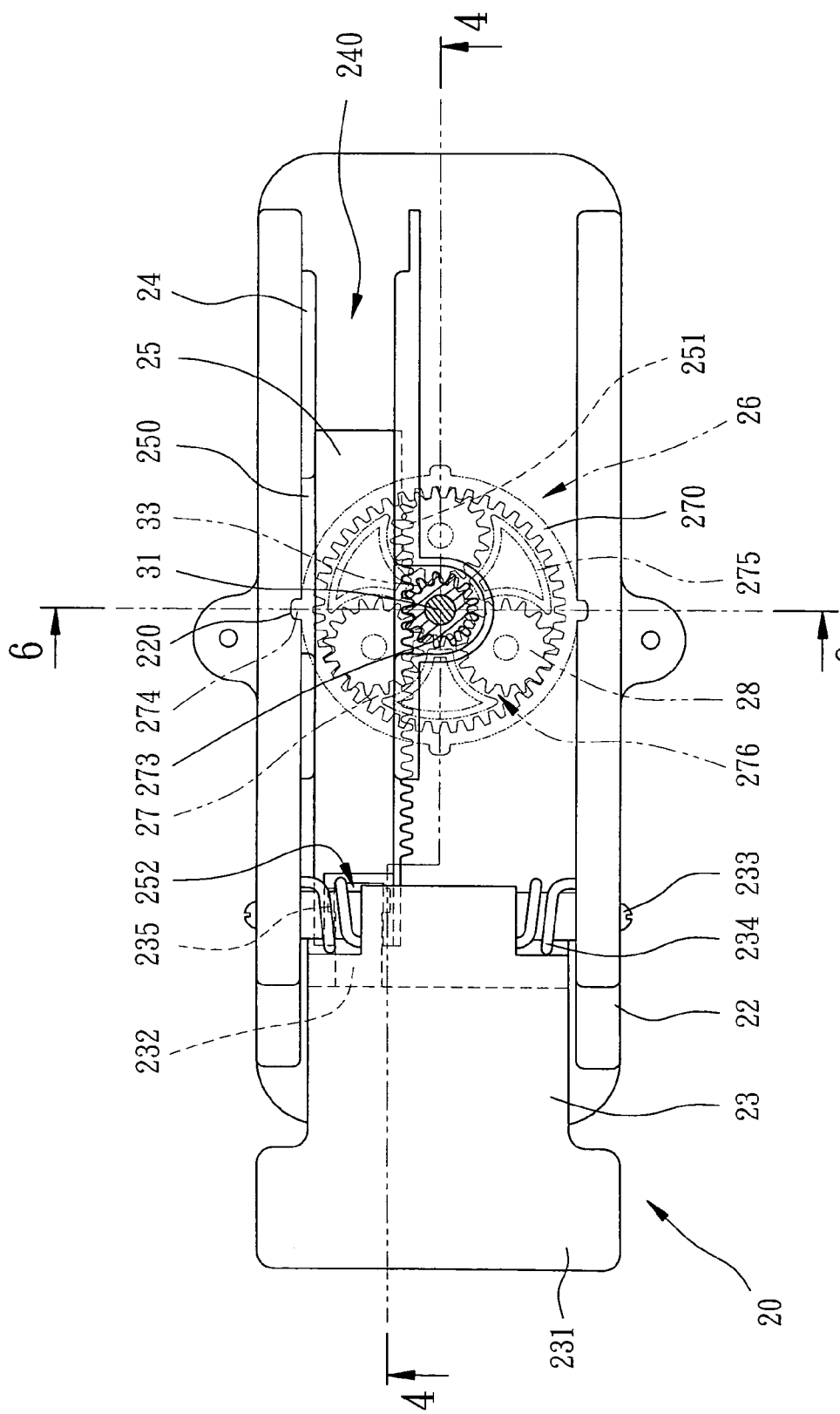
FIG. 4 is a top plan view of a drive device of the centrifugal water separator in accordance with the present invention.
Figure 5:
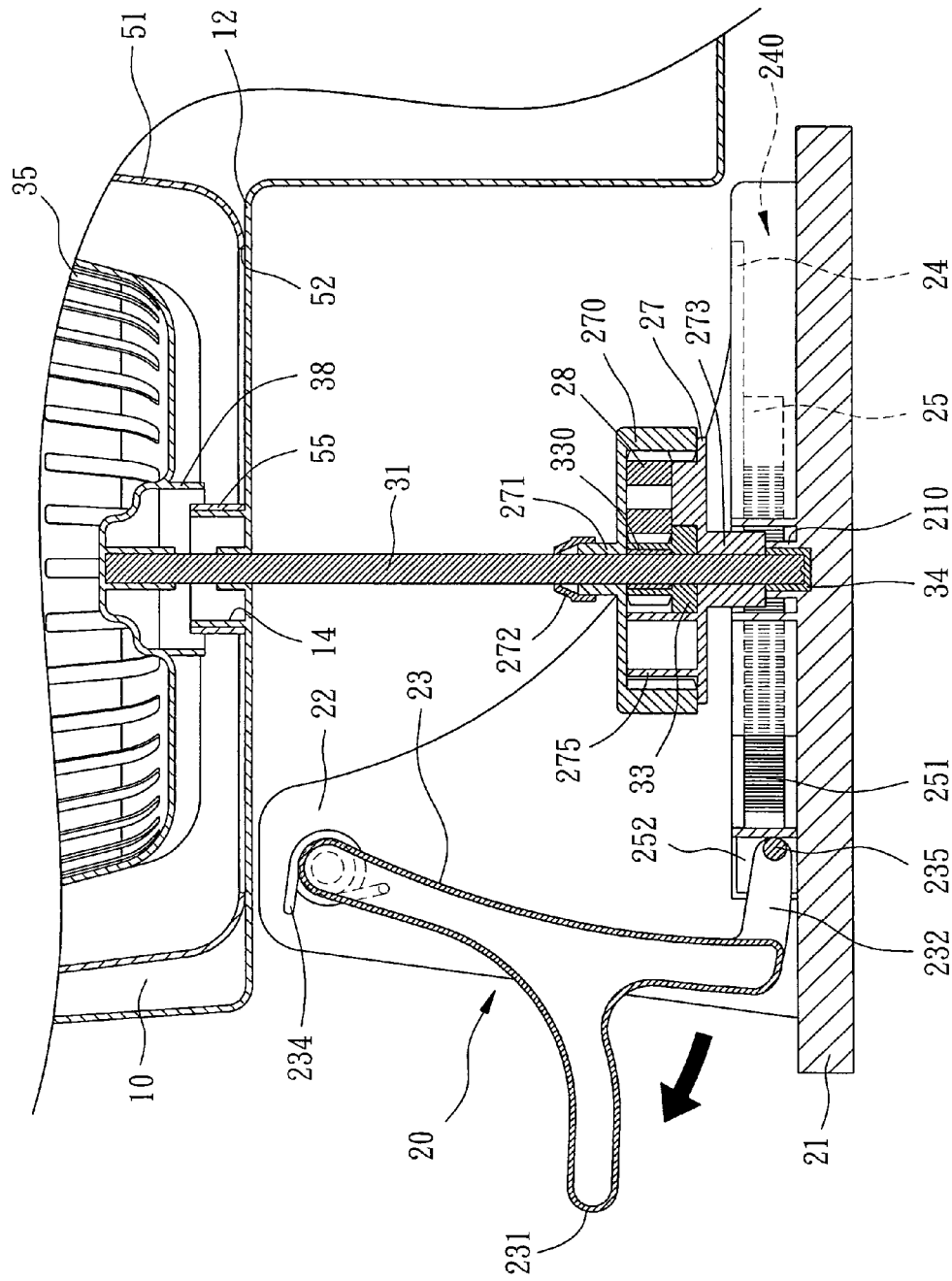
FIG. 5 is a cross-sectional view of the drive device and the separating device of the centrifugal water separator in accordance with the present invention along line 5-5 in FIG. 4.
Figure 6:
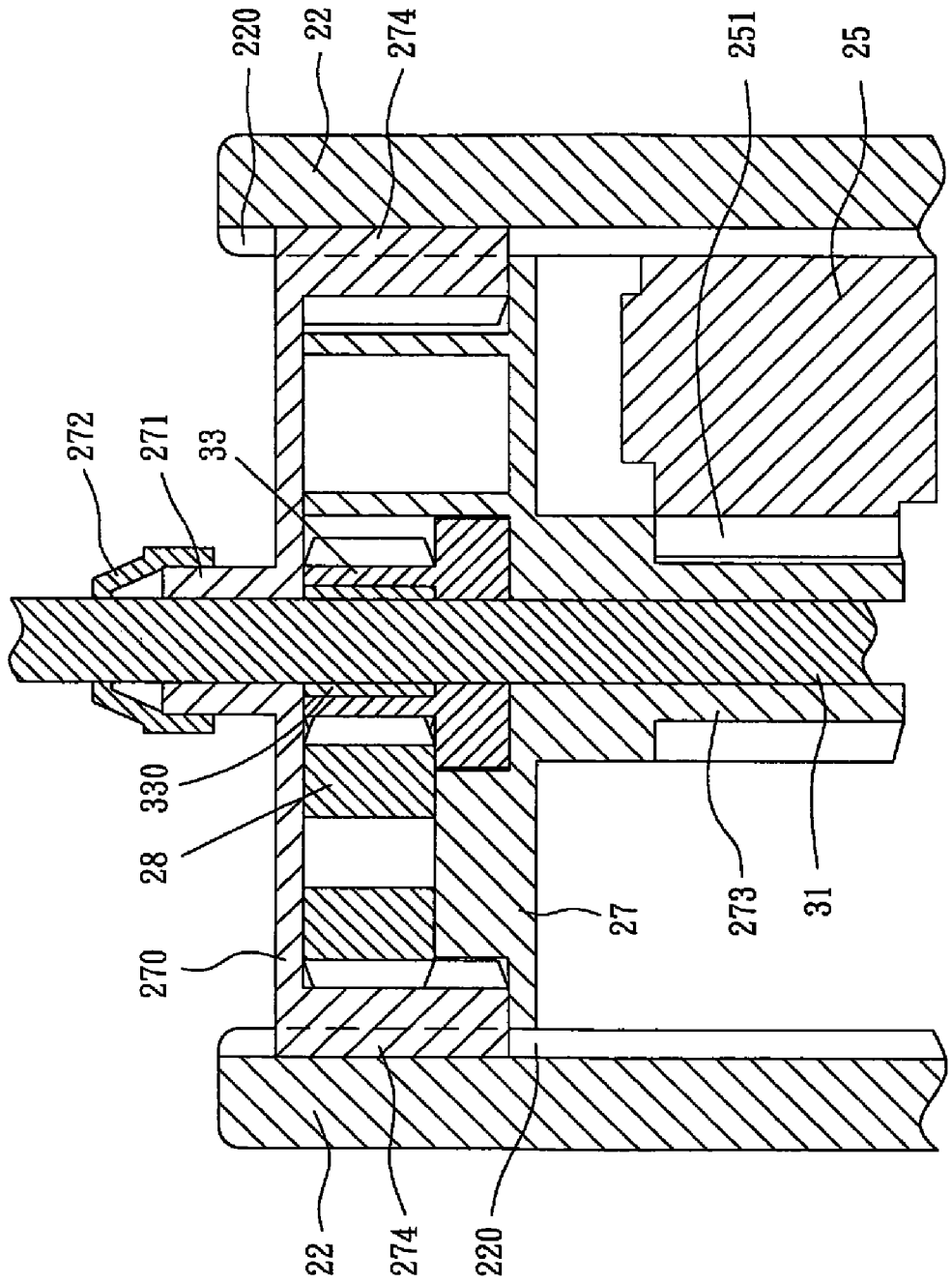
FIG. 6 is a partially cross-sectional view of the drive device of the centrifugal water separator in accordance with the present invention along line 6-6 in FIG. 4.

With reference to FIGS. 4-6, the driving device (20) includes a one-way clutch bearing (330) securely sleeved on the axle (31). The drive device (20) includes a base (21) secured on a bottom of the third room (13). A bearing seat (210) perpendicularly and upwardly extends from the base (21) for securely receiving an oilless bearing (34), wherein a lower end of the axle (31) is rotatably received in the oilless bearing (34) for ensuring the axle (31) being perpendicularly maintained relative to the base (21). The base (21) includes two supports (22) respectively upwardly extending from two opposite sides of the base (21). Each support (22) has a vertical slit (220) defined in a lower portion thereof. A pedal (23) is pivotally mounted to an upper portion of each of the two supports (22). The pedal (23) has two opposite sides each having a pivot (233) laterally extending therefrom and pivotally received in a corresponding one of the two supports (22). The pedal (23) is formed with a step portion (231) for user to easily operate the pedal (23) and a pusher (232) extending toward the center of the bucket (10). Each pivot (233) has a spring sleeved thereon for providing restitution force to the pedal (23) and the pusher (232) has two opposite sides each having a connector (235) laterally extending therefrom.

The base (21) has two inverse L-shaped wing plates (24) upwardly extending therefrom and faced to each other. The two wing plates (24) define a groove (240) therebetween and a slider (25) is slidably received in the groove (240). The slider (25) has includes opposite sides each having a flange (250) laterally extending therefrom and engaged to a corresponding one of the two wing plates (24). The slider (25) has a series of teeth (251) laterally formed on one side thereof and corresponding to the axle (31). The slider (25) has a T-shaped groove (252) defined in one end thereof for receiving the pusher (232) and the connectors (235) such that the slider (25) is linearly moved when the pedal (23) is stepped.

A planet gear set (26) is sleeved on the axle (31) and used as a speed increaser. The planet gear set (26) includes a rotor (27) rotatably sleeved on the axle (31). The rotor (27) has three blocks (275) extending therefrom toward the separating device (30) to define three rotating rooms (276). Each rotating room (276) has a planet gear (28) rotatably mounted therein. A sun gear (33) is securely sleeved on the one-way clutch bearing (330) and outwardly engaged to the three planet gears (28). A ring gear (270) is longitudinally mounted to the rotor (27) and inwardly engaged to the three planet gears (28). The ring gear (270) has a protrusion (271) centrally and longitudinally upwardly extending therefrom and the axle (31) rotatably extends through the protrusion (271). A sealant (272) is mounted onto the protrusion (271) to prevent the planet gear set (26) from being wetted. With reference to FIG. 6, the ring gear (270) has multiple ribs (274) formed on an outer periphery thereof and respectively received in a corresponding one of the two slit (220) such that the ring gear (270) is stable relative to the base (21). The rotor (27) has a gear (273) downward and centrally extending therefrom and engaged to the series of teeth (251). Consequently, the slider (25) is moved to drive the planet gear set (26) to rotate the axle (31) with the separating trough (35) due to the one-way clutch bearing (330) when the pedal (23) is stepped to push the slider (25). The pedal (23) is automatically moved to its original position and pulls back the slider (25) due to the restitution force of the two springs (234) when the step force is released. The axle (31) is idle relative to the sun gear (33) when the slider (25) is reversely moved.

The fender (50) includes a bowl (51) mounted to the skirt (14), and the axle (31) rotatably and centrally extends through the bowl (51). Consequently, the separating trough (35) is received in the bowl (51) and rotatable relative to the bowl (51). The bowl (51) has multiple drain hole (52) defined in a bottom thereof. The bowl (51) has a ring structure (53) upwardly extending from a top portion thereof and the separating trough has a bent lip (36) downward extending from a periphery thereof to define an annular groove (37) for separately receiving the ring structure (53) of the bowl (51) to prevent the stagnant water from being splashed out of the bucket (10). The bowl (51) has as flange (54) laterally extending therefrom and abutting an inner periphery of the bucket (10) for positioning the bowl (51). The bowl (51) has a collar (55) centrally formed thereon for securely received the skirt (55). The separating trough (35) has a skirt (38) centrally extending therefrom for surrounding the collar (55) to prevent the stagnant water from splashing in the axle (31).

Figure 14:
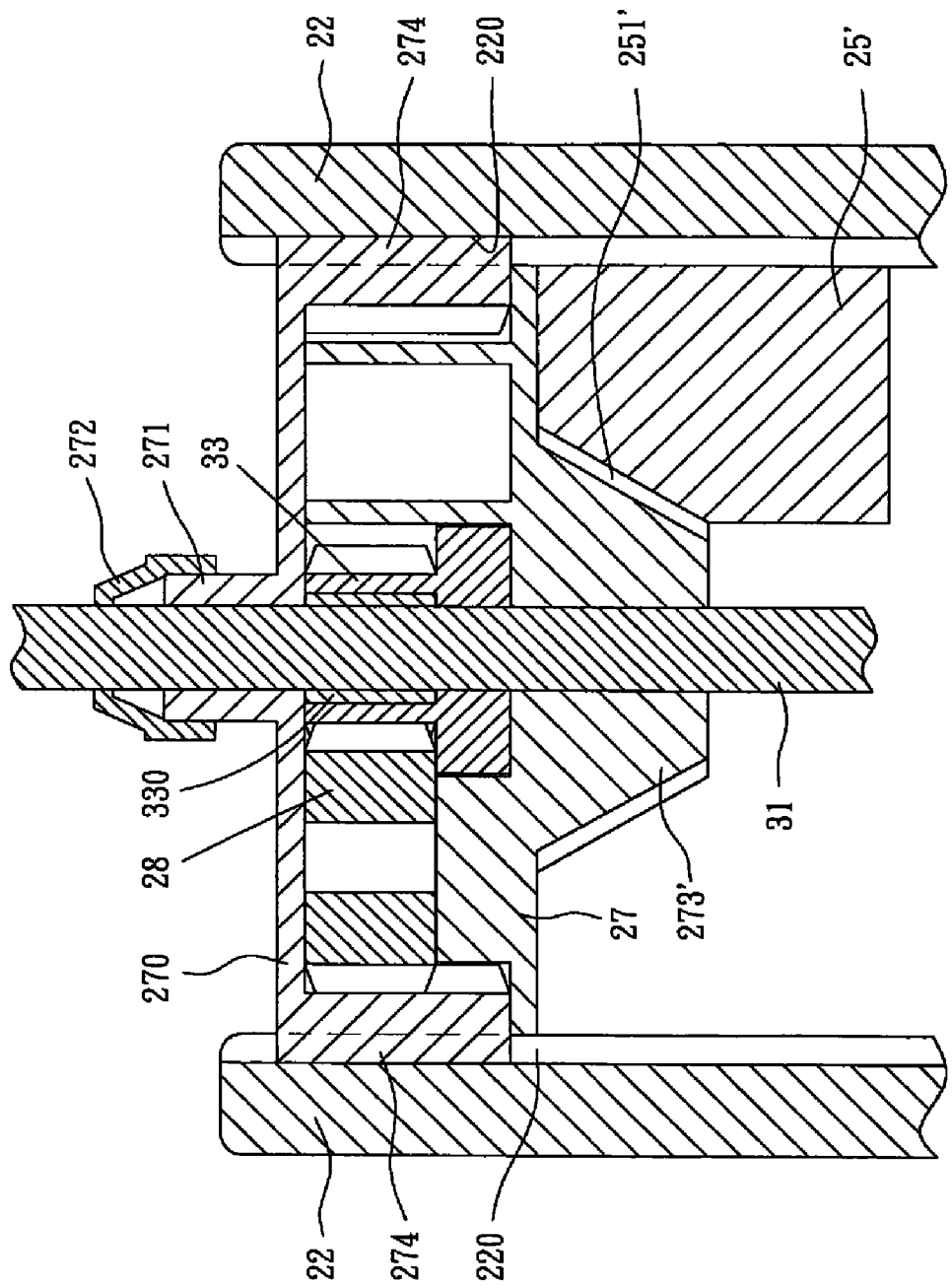
FIG. 14 is a second embodiment of the series teeth of the slider and the gear in FIG. 2.

Further with reference to FIG. 14 that shows a second embodiment of the series of teeth (251') of the slider (25') and the gear (273'), in this embodiment, the series of teeth (251') is bevel and the gear (273') is a bevel gear.

Figure 7:
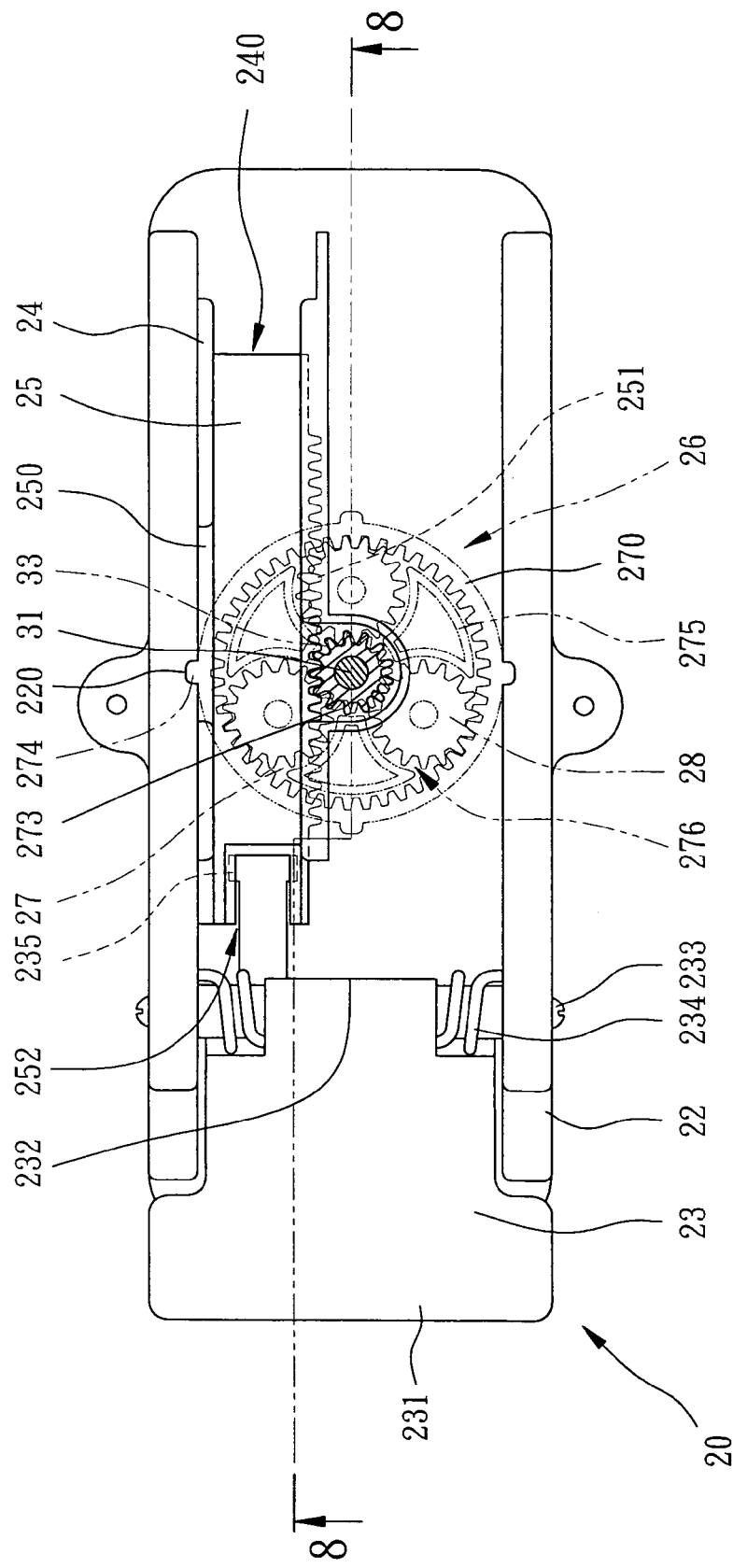
FIG. 7 is an operational view of the drive device of the centrifugal water separator in accordance with the present invention.
Figure 8:
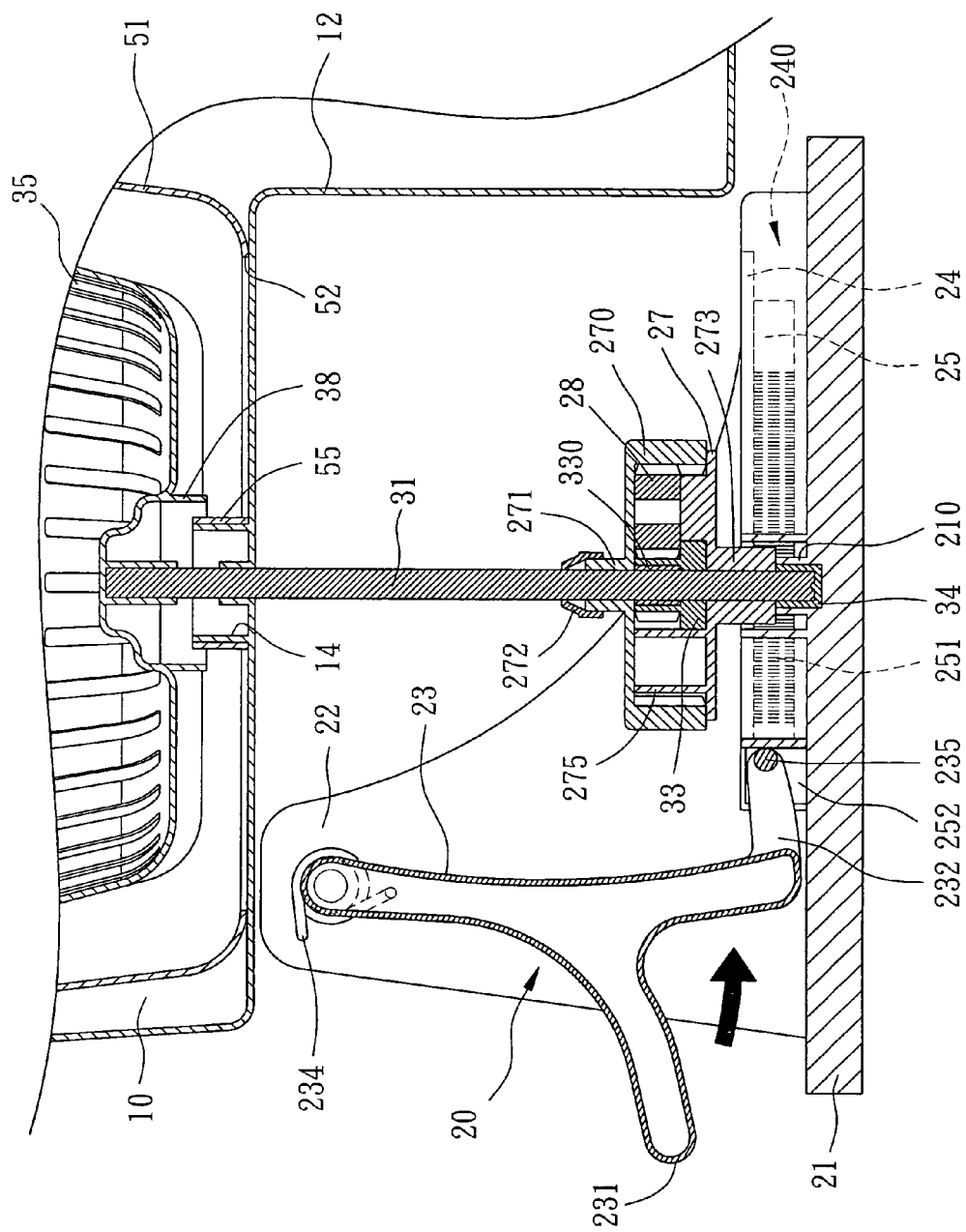
FIG. 8 is an operational view of the drive device in cross-section along line 8-8 in FIG. 7.

With reference to FIGS. 7 and 8, when operating the centrifugal water separator in accordance with the present invention, the head of the mop is put into the separating trough (35) and the step portion (231) of the pedal (23) is stepped to make the slider (25) move relative to the base (21). Consequently, the series of teeth (251) of the slider (25) drives the gear (273) with the rotor (27) to make the rotor (27) being rotated relative to the ring gear (270) such that the planet gears (28) drive the sun gear (33) and the axle (31) due to the one-way clutch bearing (330). The axle (31) is idle relative to the sun gear (33) due to the one-way clutch bearing (330) when the slider (25) and the pedal (23) are respectively moved to their original positions. As a result, the separating trough (35) and the axle (31) are always rotated in one direction.

The rotate speed of the rotor (27) is gradually increased after the pedal (23) being reciprocally stepped and the separating trough (35) with the axle (31) is rotated in a high speed due to the planet gear set (26) for separating the water from the head of the mop due to the centrifugal force of the rotating separating trough (35). In the preferred embodiment of the present invention, the planet gear set (26) is used as a speed increaser such that the drive force is equally distributed to the periphery of the axle (31) such that the side stress is disappeared and the separating trough (35) with the axle (31) is stably rotated during being operating for separating the water from the head of the mop.

Figure 9:
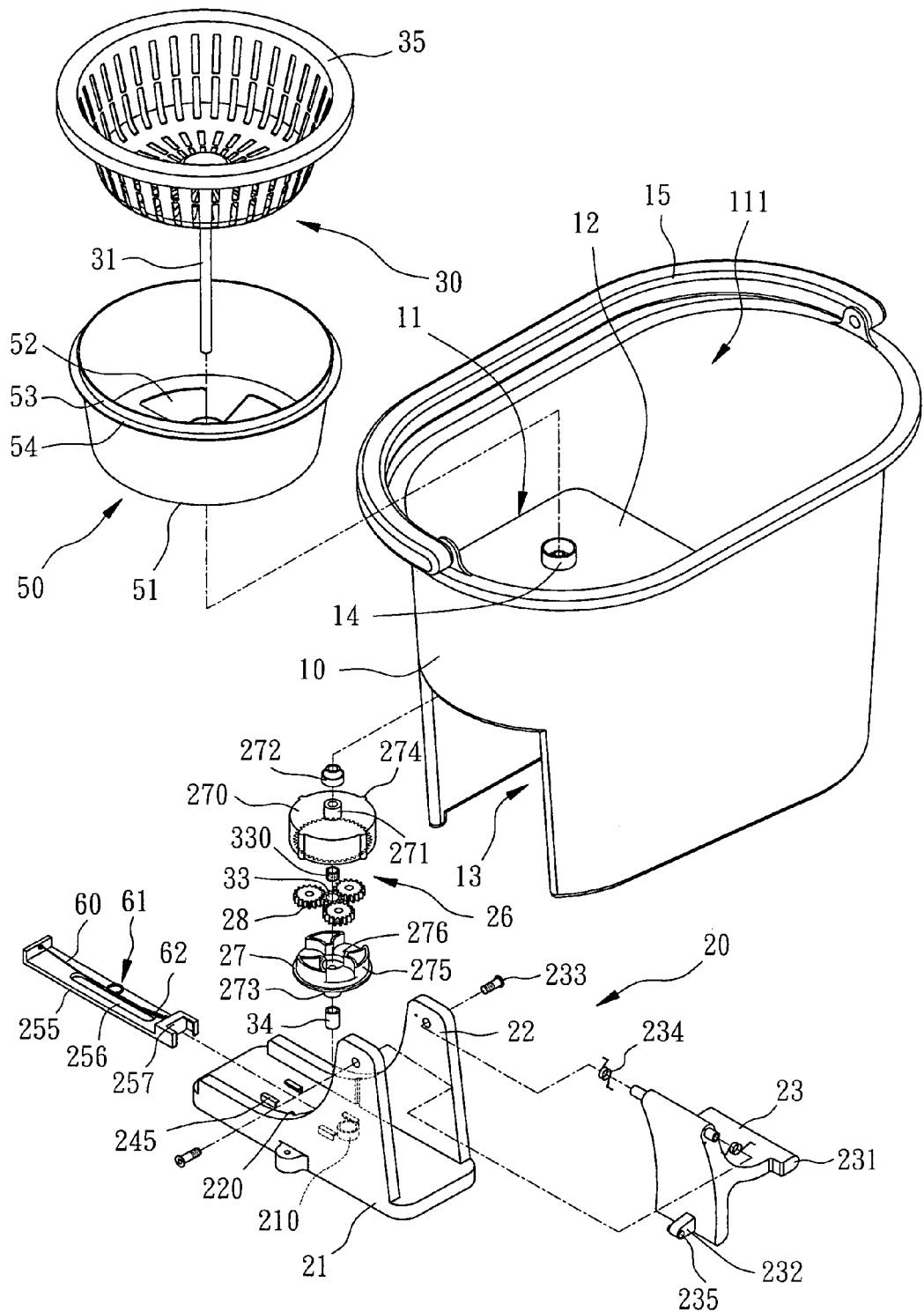
FIG. 9 is an exploded perspective view of a second embodiment of the centrifugal water separator for mop in accordance with the present invention.
Figure 10:
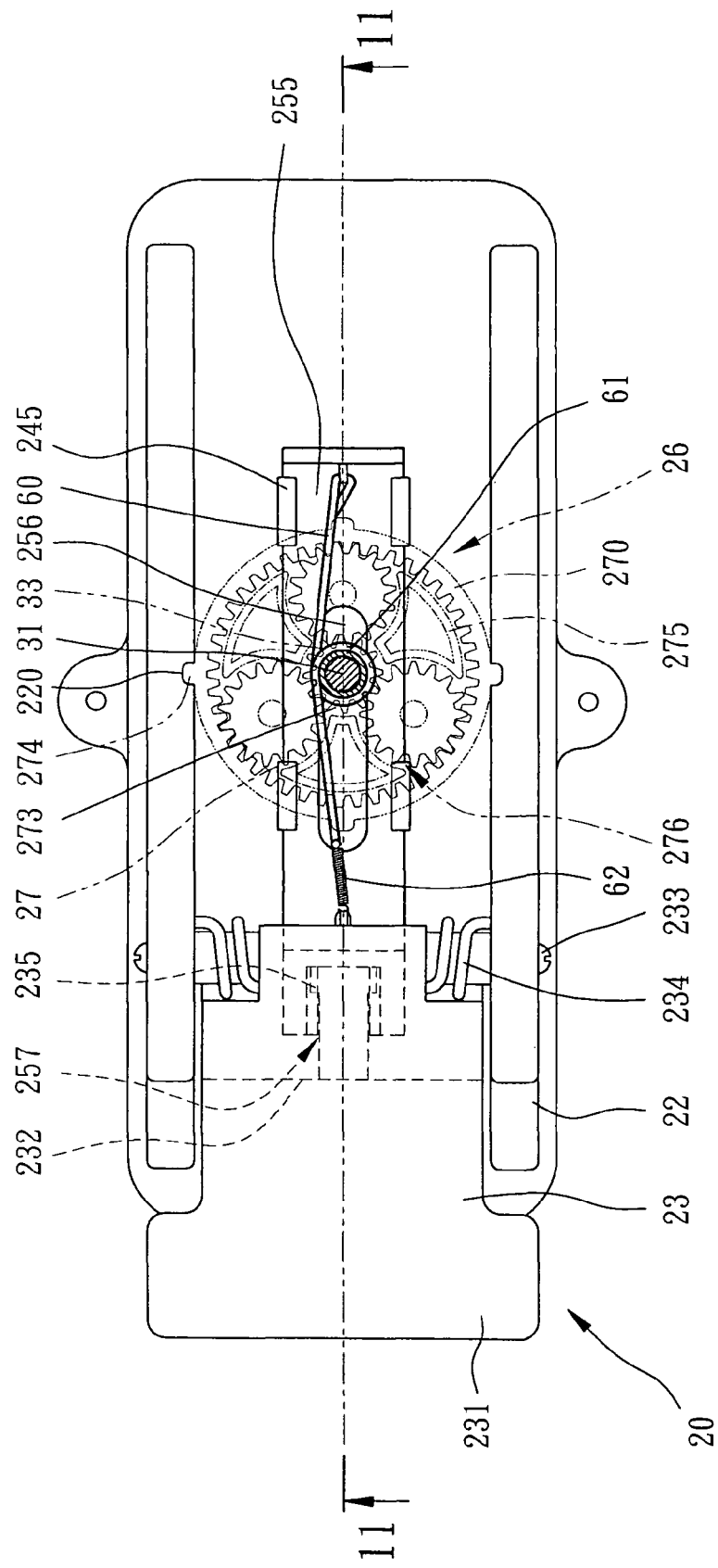
FIG. 10 is a top plan view of the drive device of the centrifugal water separator in FIG. 9.
Figure 11:
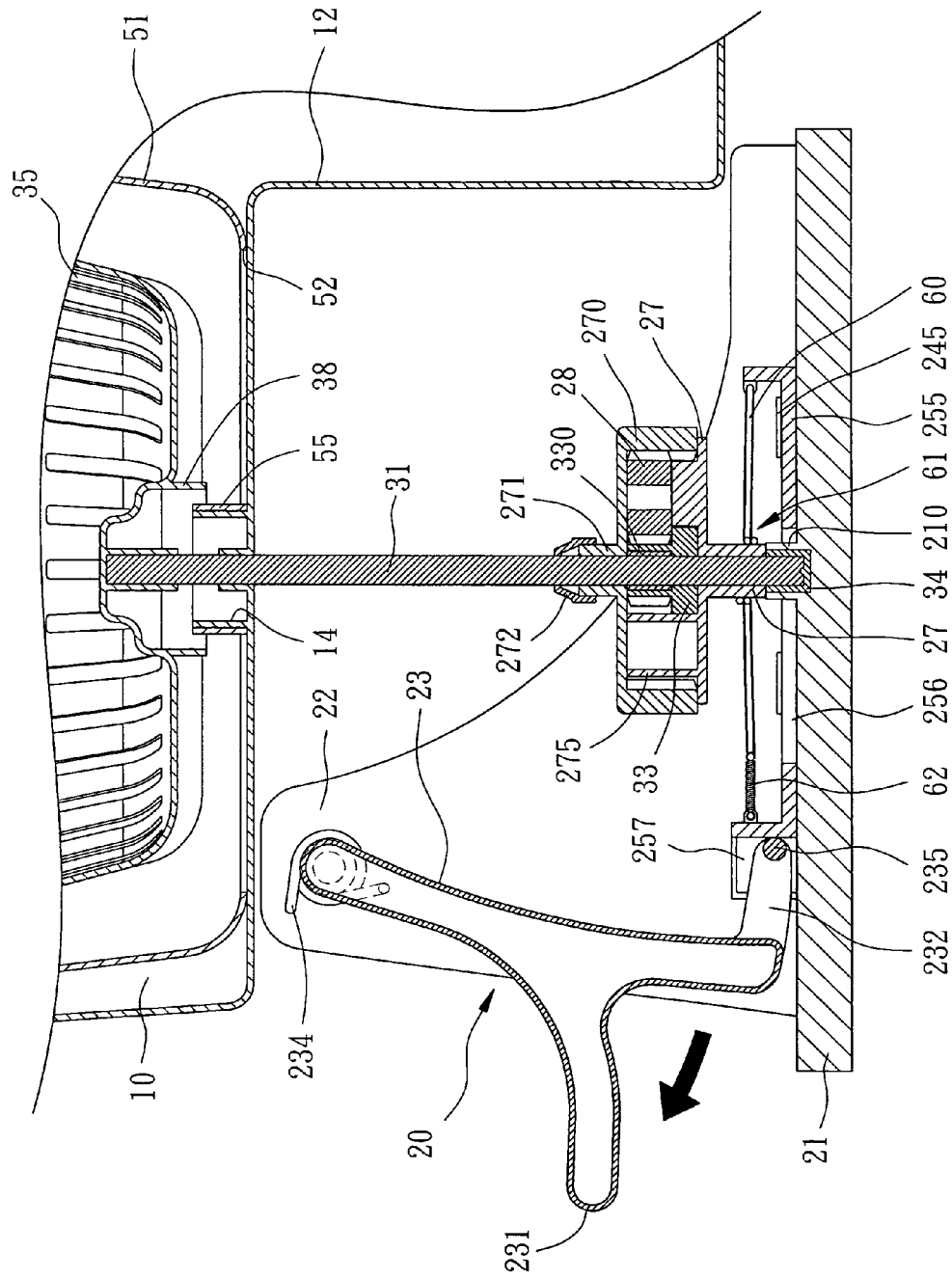
FIG. 11 is a cross-sectional view of the drive device of the centrifugal water separator in FIG. 10 along line 11-11.

With reference to FIGS. 9 to 11 that show a second embodiment of the centrifugal water separator in accordance with the present invention, in this embodiment, the base (21) of the drive device (20) has two pairs of L-shaped wing plates (245) upwardly extending therefrom and corresponding to a center axis of the base (21). The L-shaped wing plates (245) are lower than the L-shaped wing plates (24) is the first embodiment hereinbefore. A slider (255) is slidably mounted on the base (21) due to the two pairs of the wing plates (245). A groove (256) is longitudinally defined in the slider (255) for allowing the bearing seat (210) extending through the slider (255) and a T-shaped groove (257) is defined in one end of the slider (255) for receiving the pusher (232) and the connectors (235) such that the slider (255) is synchronously operated with the pedal (23). A flexible rope (60) has two opposite ends respectively connected to two opposite ends of the slider (255). The flexible rope (60) has a winding portion (61) formed for winding the rotor (27). An extension spring (62) is disposed between the flexible rope (60) and the slider (255) and corresponds to the pedal (23) wherein the restitution force of the extension spring (62) is smaller than that of the two springs (234) such that the winding portion (61) can tightly wind the rotor (27) for driving the rotor (27) to operate the planet gear set (26) and rotate the separating trough (35).

Figure 12:
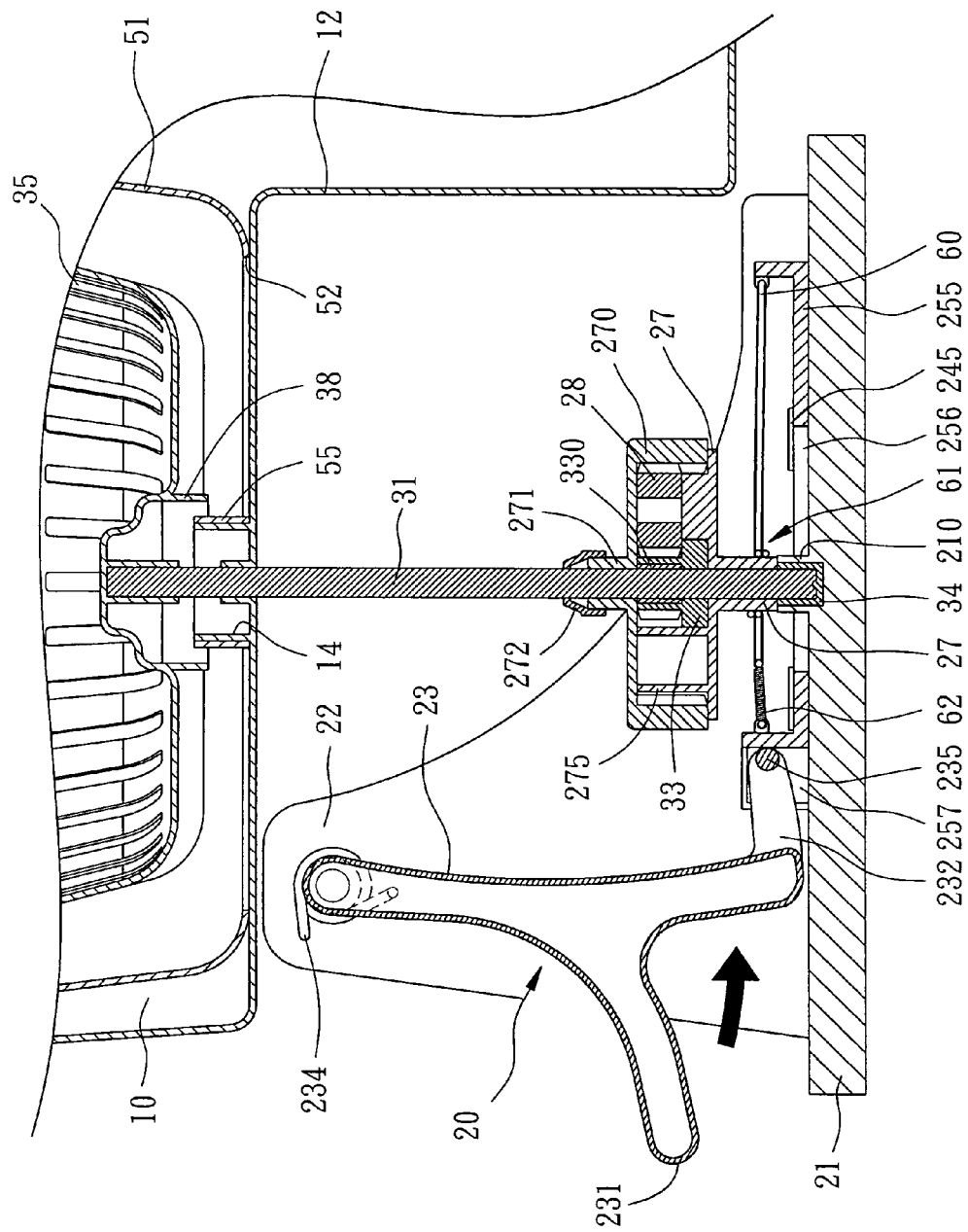
FIG. 12 is a top operational plan view of the drive device of the centrifugal water separator in FIG. 9.
Figure 13:
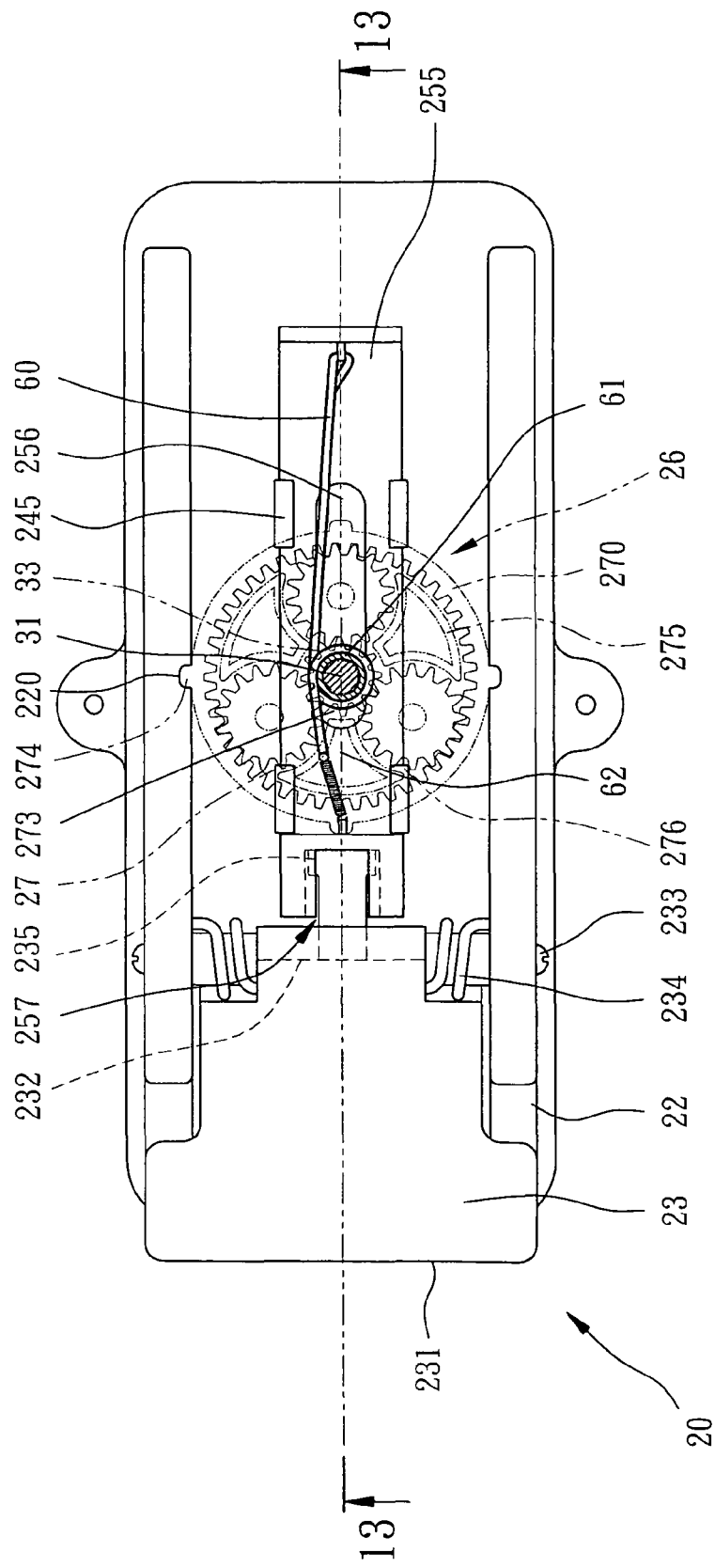
FIG. 13 is a side operational view of the drive device in FIG. 12 along line 13-13.

With reference to FIGS. 12 and 13, when operating the embodiment of the centrifugal water separator in accordance with the present invention, the head of the mop is put into the separating trough (35) and the step portion (231) of the pedal (23) is stepped to make the slider (255) move relative to the base (21). Consequently, the flexible rope (60) direct drive the rotor to make the rotor (27) being rotated relative to the ring gear (270) such that the planet gears (28) drive the sun gear (33) and the axle (31) due to the one-way clutch bearing (330). The axle (31) is idle relative to the sun gear (33) due to the one-way clutch bearing (330) when the slider (255) and the pedal (23) are respectively moved to their original positions. As a result, the separating trough (35) and the axle (31) are always rotated in one direction.

The rotate speed of the rotor (27) is gradually increased after the pedal (23) being reciprocally stepped and the separating trough (35) with the axle (31) is rotated in a high speed due to the planet gear set (26) for separating the water from the head of the mop due to the centrifugal force of the rotating separating trough (35). In the preferred embodiment of the present invention, the planet gear set (26) is used as a speed increaser such that the drive force is equally distributed to the periphery of the axle (31) such that the side stress is disappeared and the separating trough (35) with the axle (31) is stably rotated during being operating for separating the water from the head of the mop.

Figure 15:
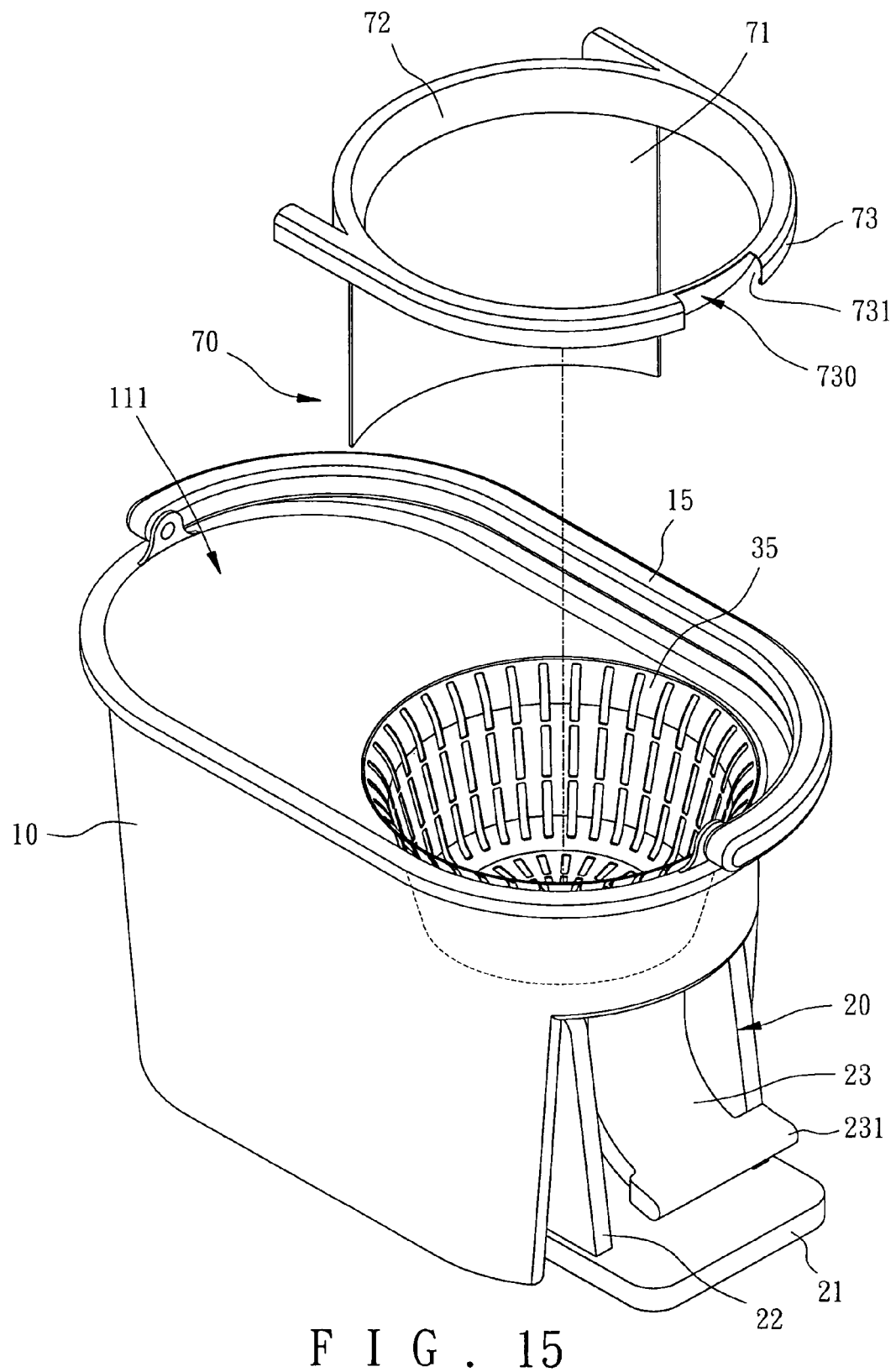
FIG. 15 is an exploded perspective view of a third embodiment of the centrifugal water separator in accordance with the present invention.
Figure 16:
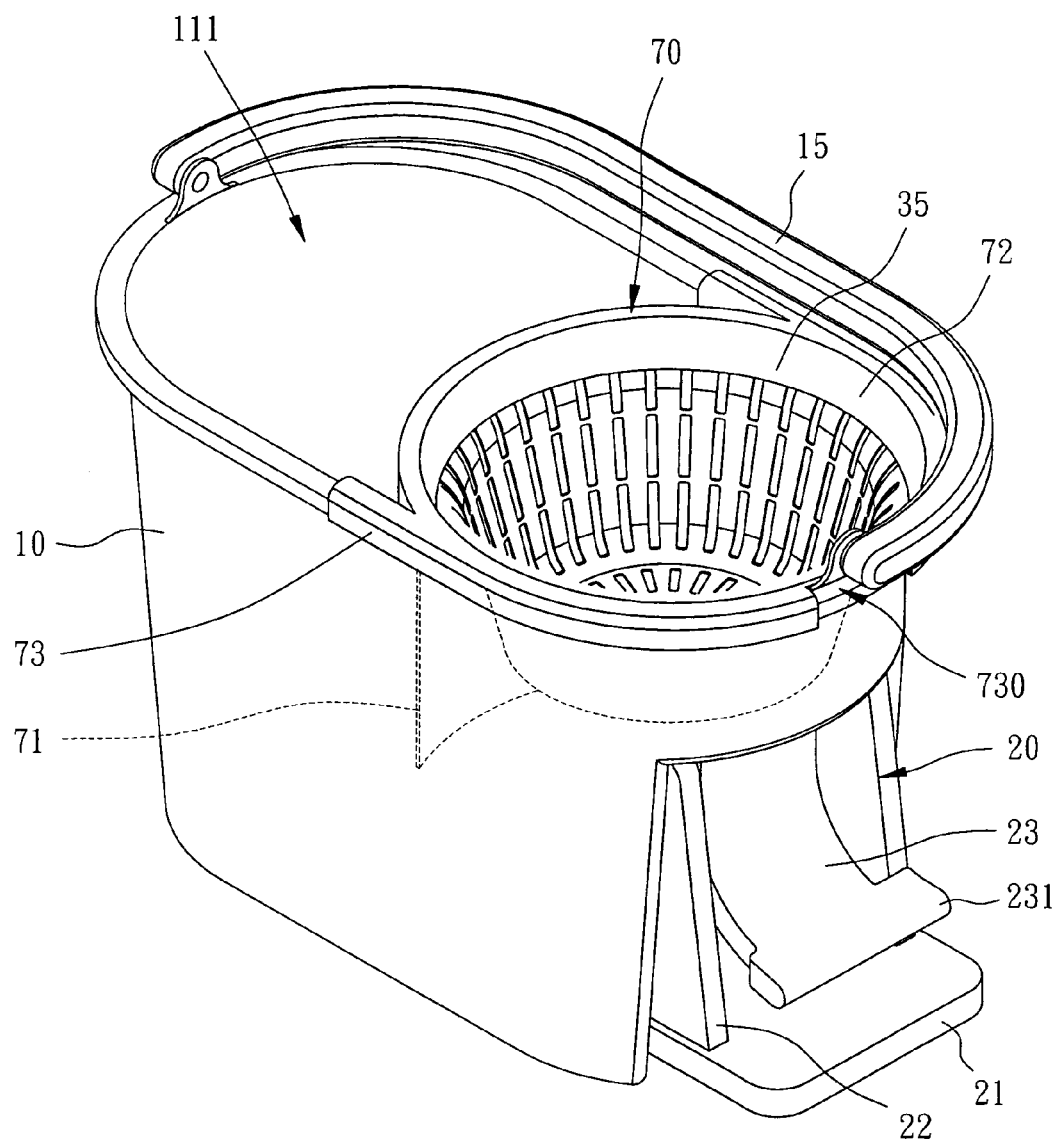
FIG. 16 is a perspective view of a third embodiment of the centrifugal water separator in accordance with the present invention.
Figure 17:
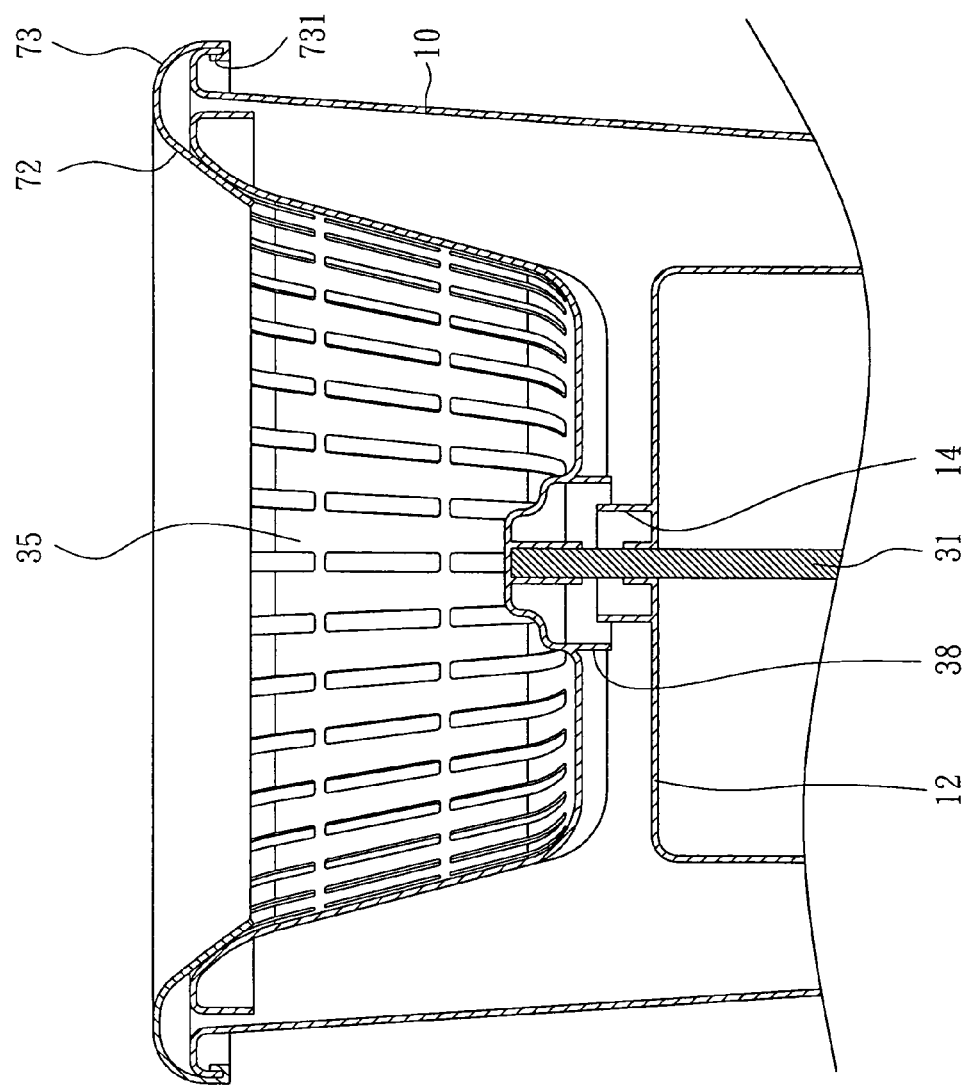
FIG. 17 is partially cross-sectional view of the centrifugal water separator in FIG. 16.

With reference to FIGS. 15-17 that show a third embodiment of the centrifugal water separator in accordance with the present invention, in this embodiment, a water fender (70) is mounted to a top portion of the bucket (10) to partition the separating device (30) and the second room (111). The water fender (70) has an apron (71) extending therefrom and inserted into the bucket (10) to prevent the stagnant water from splashing on the user. The water fender (70) is formed with an annular plate (72) inserted into the separating trough (35) to prevent the stagnant water from splashing out of the top periphery of the separating trough (35). The water fender (70) has a semicircle buckle (73) formed thereon and engaged to a top periphery of the buckle (10) for positioning the water fender (70). A hook (730) is formed on an edge of the buckle (73) for engaged to a top edge of the bucket (10). An indentation (731) is defined in a middle portion of the buckle (73) to make the handle (15) freely moved relative to the bucket (10).

Figure 18:
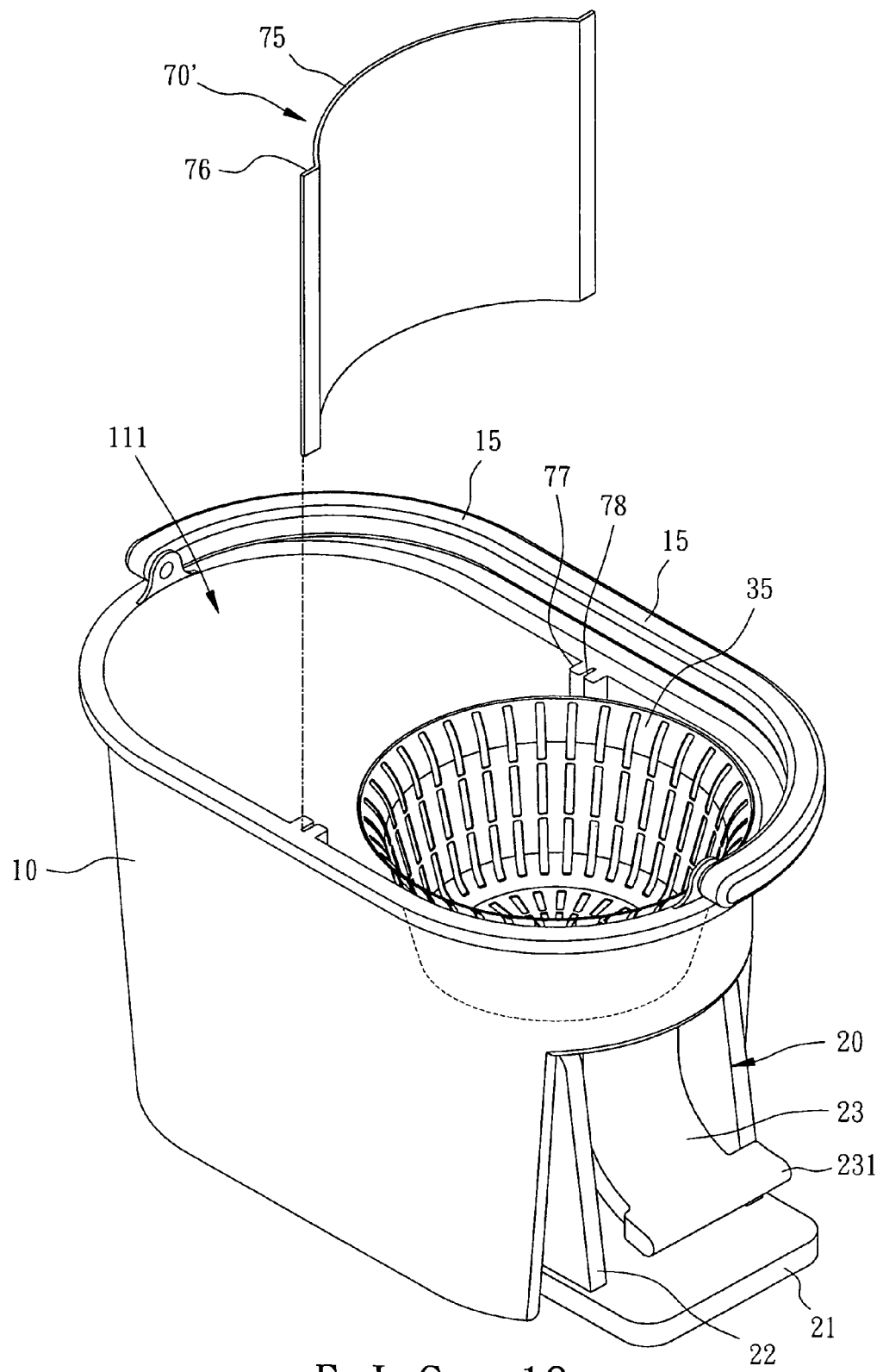
FIG. 18 is an exploded perspective view of a fourth embodiment of the centrifugal water separator in accordance with the present invention.
Figure 19:
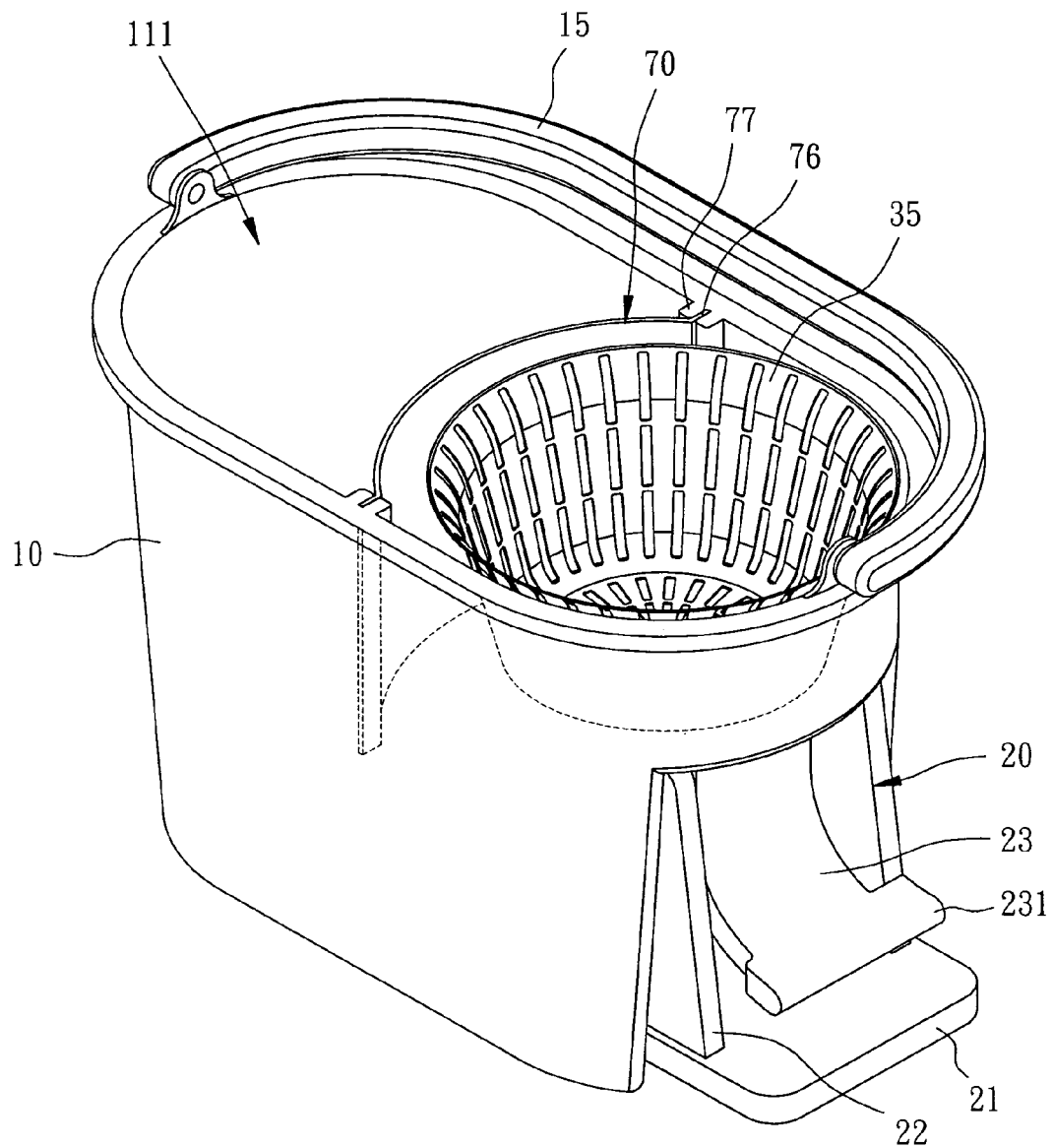
FIG. 19 is a perspective view of the fourth embodiment of the centrifugal water separator in accordance with the present invention.

With reference to FIGS. 18 and 19, the water fender (70') has a curved plate (75) directly inserted into the bucket (10) to separate the separating trough (35) from the second room (111). The curved plate (75) has two opposite sides each having a plug (76) laterally extending therefrom. The bucket (10) has two rails (77) formed on an inner periphery of the bucket (10). Each rail (77) has a slot (78) longitudinally defined therein for slidably receiving a corresponding one of the two plugs (76) for positioning the water fender (70').

Although the invention has been explained in relation to its preferred embodiment, it is to be understood that many other possible modifications and variations can be made without departing from the spirit and scope of the invention as hereinafter claimed.

What is claimed is:

1. A centrifugal water separator for mop, comprising a bucket, a separating device and a drive device respectively mounted in the bucket, a first room, a second room and a third room respectively defined in the bucket, wherein an L-shaped partition is formed in the bucket to separate the third room from the first room and the second room, and the first room laterally communicates with the second room, the separating device including an axle perpendicularly extending from the partition and a separating trough secured mounted to an upper end of the axle, the drive device including a pedal mounted thereon for driving the axle with the separating trough when being stepped, the drive device including a planet gear set sleeved on the axle and connected to the pedal for effectively drive the axle and used as a speed increaser, the planet gear set including a one-way clutch bearing securely sleeved on the axle for driving the axle in one-way and a sun gear sleeved on the one-way clutch bearing for driving the one-way clutch bearing, a rotor and a ring gear respectively rotatably sleeved on the axle, multiple planet gears mounted between the rotor and the ring gear for driving the sun gear when the rotor is rotated.

2. The centrifugal water separator as claimed in claim 1, wherein the ring gear includes a protrusion centrally extending therefrom and the axle extends through the protrusion, a sealant mounted to the protrusion of the ring gear to prevent the planet gear set from being wetted.

3. The centrifugal water separator as claimed in claim 1, wherein the drive device includes a base secured on a bottom of the third room in the bucket, the pedal reciprocally pivotally mounted on the base, the pedal having a step portion formed thereon and extending out of the third room for user to step the pedal, a pusher extending from the pedal opposite to the step portion, a slider slidably mounted on the base for driving the planet gear set and connected to the pusher.

4. The centrifugal water separator as claimed in claim 3, wherein the slider has a series of teeth laterally formed on one side thereof and the rotor has a gear formed on a lower side thereof, the gear engaged to the series of teeth of the slider.

5. The centrifugal water separator as claimed in claim 3, the slider has a groove longitudinally defined therein and a flexible rope mounted to the slider for driving the rotor, the flexible rope having a winding portion formed for winding the rotor.

6. The centrifugal water separator as claimed in claim 3, wherein the base has two supports upwardly extending therefrom for supporting the pedal, the pedal having two pivots respectively laterally extending from two opposite sides of the pedal and pivotally mounted to a corresponding one of the two supports, each pivot having a spring sleeved thereon for providing a restitution force to the pedal after being stepped.

7. The centrifugal water separator as claimed in claim 6, wherein each support has a slit defined in an inner side thereof and the ring gear has two ribs formed on an outer periphery of the ring gear, each rib received in a corresponding one of the two slits for positioning the ring gear.

8. The centrifugal water separator as claimed in claim 3, wherein the pusher has two connectors respectively laterally extending from two opposite sides thereof and the slider has a T-shaped groove defined in one end thereof for receiving the pusher and the two connectors.

* * * * *